United States Patent [19]

Tarumi et al.

[11] Patent Number: 5,180,228

[45] Date of Patent: Jan. 19, 1993

[54] RADIATION THERMOMETER FOR MOLTEN IRON AND METHOD FOR MEASURING THE TEMPERATURE OF MOLTEN IRON

[75] Inventors: Yoshihiko Tarumi; Atuhisa Takekoshi; Mamoru Inaba; Yoshiro Nishi; Masaaki Sakurai, all of Tokyo; Satoshi Sakamoto, Takasago; Kimihiko Sato, Tokyo, all of Japan

[73] Assignees: Asahi Glass Company Ltd.; NKK Corporation, both of Tokyo, Japan

[21] Appl. No.: 816,548

[22] Filed: Dec. 30, 1991

Related U.S. Application Data

[63] Continuation of Ser. No. 574,133, Aug. 29, 1990, abandoned.

[30] Foreign Application Priority Data

Sep. 18, 1989 [JP] Japan ................................ 1-240993

[51] Int. Cl.⁵ .......................... G01K 1/12; G01K 1/14; G01J 5/10
[52] U.S. Cl. .................................... 374/139; 374/140; 374/208
[58] Field of Search ........................ 374/139, 140, 208

[56] References Cited

U.S. PATENT DOCUMENTS

| | | | |
|---|---|---|---|
| 2,020,019 | 11/1935 | Collins et al. | 374/140 |
| 2,490,617 | 12/1949 | Bristol | 374/140 |
| 2,709,367 | 5/1955 | Bohnet | 374/131 |
| 3,106,493 | 10/1963 | Japka | 374/139 |
| 3,580,744 | 5/1971 | Inouye et al. | 374/139 |
| 3,626,758 | 12/1971 | Stewart et al. | 374/131 |
| 4,619,533 | 10/1986 | Lucas et al. | 374/139 |
| 4,737,038 | 4/1988 | Dostoomian | 374/139 |
| 4,770,544 | 9/1988 | Mossey | 374/144 |
| 5,064,295 | 11/1991 | Thill et al. | 374/208 |

FOREIGN PATENT DOCUMENTS

| | | | |
|---|---|---|---|
| 0030638 | 2/1986 | Japan | 374/139 |
| 0217129 | 9/1987 | Japan | 374/139 |
| 1-163634 | 6/1989 | Japan | 374/139 |
| 1-288738 | 11/1989 | Japan . | |
| 1-288741 | 11/1989 | Japan . | |
| 1-299424 | 12/1989 | Japan | 374/139 |
| 1-321327 | 12/1989 | Japan | 374/139 |
| 0038932 | 2/1990 | Japan | 374/139 |
| 2045433 | 10/1980 | United Kingdom | 374/208 |

OTHER PUBLICATIONS

Current Advances in Materials and Processes, vol. 2, No. 5, 1989, p. 1446, pp. 17-19, Yoshihiko Tarumi.

Primary Examiner—William A. Cuchlinski, Jr.
Assistant Examiner—Diego F. F. Gutierrez
Attorney, Agent, or Firm—Oblon, Spivak, McClelland, Maier & Neustadt

[57] ABSTRACT

A radiation thermometer for measurement of the temperature of molten iron includes a probe tube with a sealed bottom in the form of a spheroidal shape and is made of zirconium boride ceramics. The probe tube is immersed in molten iron and radiation emitted from the spheroidal closed end of the probe tube is received by a sensor at the far end of the tube which is above the level of the molten iron. The spheroidal end of the probe tube is below the surface of molten iron by more than 10 times the inner radius of the probe tube.

12 Claims, 6 Drawing Sheets

Time (min)

RADIATION THERMOMETER FOR MOLTEN IRON AND METHOD FOR MEASURING THE TEMPERATURE OF MOLTEN IRON

This application is a continuation of application Ser. No. 07/574,133, filed on Aug. 29, 1990, now abandoned.

BACKGROUND OF THE INVENTION

1. Field of the Invention

The present invention relates to a radiation thermometer for measuring continuously the temperature of molten iron such as molten pig iron or molten steel and a method of measuring the temperature of molten iron by using the radiation thermometer.

2. Discussion of Background

There is a strong demand of measuring continuously and stably the temperature of molten iron such as molten pig iron or molten steel in order to achieve automation and artificial intelligence (AI) control in the processes from pig iron making to steel making.

As a conventional technique of measuring the temperature of molten iron, there has been employed a method that temperature measurement is conducted intermittently and at short time intervals by immersing a disposal thermometer in which a thermocouple is sealed in a protecting tube made of quartz glass (an immersion type thermometer) at every 15-20 minutes, as a method of obtaining reliable values of measurement, for instance. However, the conventional method is complicated and troublesome, and it is not suitable for continuous temperature measurement of molten iron.

Further, as a method of continuously measuring temperature, there has been employed a method of measuring the surface temperature of the molten pig iron by a radiation thermometer. In such method, however, it was inavoidable that values of measurement often fluctuated to the lower temperature side since slag floating on the surface of the molten metal interrupts the radiation. Further, it was difficult to obtain reliable values of measurement by the radiation thermometer since barriers such as slag usually float on the surface of molten steel. Thus, there have been proposed no radiation thermometers for molten iron which are suitable for automation and AI control of iron making processes and which provide stably and continuously correct temperature measurement values.

In recent years, a thermocouple type thermometer for molten steel in which a protecting tube made of zirconium boride ceramics has been developed (Japanese Unexamined Patent Publication Nos. 31027/1989, 288738/1989 and 321326/1989).

Although the thermocouple type thermometer can be utilized for measuring temperature of molten iron, there still remains the problem that an error is produced in a measurement value due to deterioration of the thermocouple, and consumption of an expensive platinum-rhodium type thermocouple is unavoidable.

SUMMARY OF THE INVENTION

It is an object of the present invention to eliminate the problems in the above-mentioned conventional techniques and to provide a radiation thermometer for molten iron which is capable of measuring the temperature of molten iron in a stable, correct and continuous manner without using a thermocouple having possible deterioration and consumption.

In accordance with the present invention, there is provided a radiation thermometer for molten metal of the type which comprises a probe tube having a closed bottom end to be immersed in molten metal and a radiation meter having a sensor port to receive a radiation emitted from an inner bottom of the probe tube and thereby measure the temperature of the molten metal, wherein said molten metal being molten iron such as molten pig iron or molten steel, the probe tube is made of zirconium boride ceramics and the inner bottom of the probe tube is formed into a spheroidal shape.

In a preferred embodiment of the radiation thermometer for molten iron of the present invention, a joint tube made of metal is provided between the radiation meter and the probe tube made of zirconium boride ceramics. In another preferred embodiment of the present invention, the zirconium boride ceramics contains 1-15 wt. % of SiC and 0-29 wt. % of BN as accessory constituents and the rest being substantially $ZrB_2$.

Another preferred embodiment of the present invention, the probe tube is constituted by a probe tube made of zirconium boride ceramics and an inner probe tube made of oxide ceramics provided inside the probe tube of zirconium boride ceramics.

In another preferred embodiment of the present invention, the oxide ceramics is alumina ceramics.

In another preferred embodiment of the present invention, the entire length of the probe tube is more than 20 times but less than 700 times as large as the inner radius R of the probe tube.

In another preferred embodiment of the present invention, the bottom end of the probe tube has a uniform wall thickness and is formed into a spheroidal shape.

In another preferred embodiment of the present invention, a ring-shaped protector is disposed so as to surround around the probe tube at the surface of the molten metal.

In accordance with the present invention, there is provided a method for measuring the temperature of molten metal comprising immersing a closed bottom end of a probe tube in molten metal so as to receive a radiation emitted from the inner bottom of the probe tube on the sensor port of a radiation meter, wherein the molten metal being molten iron such as molten pig iron or molten steel, the probe tube is a probe tube made of zirconium boride ceramics, the inner bottom of the probe tube is formed into a spheroidal shape, and the depth L of the inner bottom of the probe tube immersed in the molten metal is more than 10 times as large as the inner radius R of the probe tube.

In a preferred embodiment of the method of measuring the temperature of molten iron of the present invention, the dipping portion of the probe tube is heated at a temperature not less than 800° C. before it is immersed in the molten metal.

In another preferred embodiment of the method according to the present invention, the probe tube used is constituted by a probe tube made of zirconium boride ceramics and an inner probe tube made of oxide ceramics which is disposed inside the probe tube of zirconium boride ceramics. In another preferred embodiment of the method of the present invention, non-oxidizing gas is filled in the probe tube.

In another preferred embodiment of the method of the present invention, the probe tube is previously heat treated in an oxidizing atmosphere to form $ZrO_2$ layer at the inner surface of the probe tube.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In the radiation thermometer for molten iron of the present invention, the portion of the probe tube to be immersed in molten iron undergoes a severe condition of high temperature. But, there is no consumption of an expensive platinum-rhodium thermocouple as in a conventional thermocouple type thermometer. Further, even though the probe tube is broken, there is no danger of consumption of the thermocouple installed therein.

Since the probe tube is immersed in molten metal, any influence on measurement values of the temperature of slag floating on the molten iron can be eliminated. Since zirconium boride ceramics having excellent corrosion resistance to the molten iron and the molten slag is used for the probe tube and temperature measurement is conducted by receiving a radiation emitted from the inner bottom of the probe tube on the sensor port of a radiation meter, continuous and stable temperature measurement becomes possible.

For the zirconium boride ceramics, one containing $ZrB_2$ in an amount not less than 66 wt. % is preferred. For instance, zirconium boride ceramics having a composition and characteristics such as 70-95 wt. % of $ZrB_2$, 1-15 wt. % of SiC, 0-29 wt. % of BN, a bulk density of 3-6, a bending strength of 10 kg/mm$^2$ or higher, a thermal expansion coefficient of $6 \times 10^{-6}/°C$. and a thermal spalling resistance ($\Delta T$) of 250°-1,000° C. may be used.

SiC is added as an auxiliary to accelerate the sintering of zirconium boride ceramics, and BN is added to give a thermal spalling resistance property to zirconium boride ceramics. When the quantities of accessory constituents are small, for instance, when BN is less than 4 wt. %, a sufficient effect can not be obtained. In order to assure corrosion resistance to molten iron or slag, much $ZrB_2$ constituent is preferred.

Zirconium boride ceramics without containing BN are low in thermal spalling resistance, and accordingly, a sufficient pre-heating is required, but it is excellent in durability.

With development in the field of electronics, the stability and accuracy of a radiation meter in measurement are improved and a radiation meter capable of providing temperature measurement values in a stable manner is now commercialized. Such radiation meter also contributes to the radiation thermometer for molten iron of the present invention.

When the inner bottom of the probe tube is formed in a spheroidal shape, specifically, in a hemispheroidal shape, the apparent emissivity of the bottom of the probe tube approaches 1 in comparison with a probe tube having a flat bottom. Accordingly, measurement of temperature using a hemispheroidal bottom further improves the accuracy of measurement.

For instance, when the dipping depth of the inner bottom of the probe tube $L = 200$ mm, the apparent emissivity of the probe tube having a flat inner bottom is 0.94. On the other hand, the apparent emissivity of the probe tube having a hemispherical inner bottom wherein $L/R = 10$ under the same conditions, is increased to 0.976.

By forming the bottom end of the probe tube to have a substantially uniform wall thickness and a spheroidal shape, there is little stress concentration in the wall of the probe tube when the dipping portion of the probe tube is heated or cooled, whereby the possibility that the probe tube breaks due to a thermal stress is reduced.

By disposing a joint tube made of metal between the radiation meter and the probe tube made of zirconium boride ceramics, the length of the probe tube made of zirconium boride which is expensive can be reduced to a necessary and minimum extent. Further, it is possible to adjust the position of the bottom end of the probe tube through which temperature measurement is conducted by adjusting the length of the joint tube. The joint portion between the joint tube and the probe tube is sealingly closed. When the radiation thermometer for molten iron of the present invention is used for measuring the temperature of molten iron in a bath or in a channel, disadvantages that a radiation is interrupted by the floating slag or the sensor port of the radiation meter is contaminated by fume existing in the atmosphere can be eliminated.

It is preferable that the depth L from the inner bottom of the probe tube immersed in the molten metal to the surface of the molten metal is more than 10 times but less than 30 times as large as the inner diameter R of the probe tube in order that the apparent emissivity of the inner bottom of the probe tube approaches 1. When the inner bottom is formed into a hemispheroidal shape and L/R is 10, the apparent emissivity is normally 0.97 or more. When L/R = 15, the apparent emissivity is 0.999, i.e. it means to be nearly a black body. The reason why the length L of the inner part of the probe tube to be immersed in the molten metal is less than 30 times as large as the inner diameter R is that a useful effect can not be obtained even when the probe tube is further deeply immersed. However, the length L may be more or less increased in consideration of a variable factor when the surface level of the molten metal is changeable.

The entire length of the probe tube is preferably determined to be more than 20 times R in consideration of the length necessary to join the probe tube with the joint tube and a change of the surface level of the molten metal in order to keep the value of L/R being more than 10.

It is sufficient that the entire length of the probe tube is less than 700 times as large as R because further advantage can not be obtained even by increasing the length from that value.

When the inner probe tube of oxide ceramics is disposed in the probe tube of zirconium boride ceramics, it is sufficient that the relation of R to L is satisfied for the inner probe tube.

It is preferred that the inner diameter R of the probe tube is 3 mm or more in order to maintain a sufficient angular field of view and to obtain temperature values with a high accuracy when the distance between the sensor port of the radiation meter and the inner bottom of the probe tube is 1,000 mm, for example. However, use of R having an excessively large figure provides little advantage. Accordingly, when a commercialized radiation meter is employed, R = 30 mm is sufficient.

Since the wall thickness of the probe tube is related to the durability of the probe tube, a thickness of 2 mm or more is necessary, preferably, 4 mm or more. However, when the wall thickness is excessively large, the thermal spalling resistance may be reduced. Accordingly, it is preferable that the value is 15 mm or lower.

Damage by corrosion of the probe tube is remarkable at the portion around the surface level of molten metal, and the service life depends on a speed of corrosion at the portion of the probe tube.

It is effective to provide a ring-shaped protector at the portion around the surface level of the molten metal in order to prolong the service life of the probe tube, namely, the radiation thermometer. For a material used for the protector, the various types of refractory employed for vessels for molten iron may be used. Particularly, zirconium boride type refractory or a ceramic protector is preferably used since it has a sufficient durability without increasing the wall thickness and it is usable in a limited space. Although the ring-shaped protector can be firmly attached to the probe tube with cement of inorganic material, it is preferably used in a floating state on the surface of molten metal in a case that the surface level of molten metal is vertically fluctuated.

The floating state of the ring-shaped protector can be obtained as follows. The ring-shaped protector is fitted to the probe tube and hanged by means of a wire, then the probe tube is immersed in molten iron. Or, a sealing material made of alumina silica ceramics fibers is wound around the probe tube and a ring-shaped protector is fitted to the outer circumference of the sealing material and then, the probe tube is immersed in molten iron. Thus, the wire and the sealing material are consumed in the molten iron so that the state of floating of the ring-shaped protector on the surface of the molten iron is obtainable.

It is preferable that the inner diameter of the joint tube is the same or larger than the inner diameter of the probe tube so as not to restrict the eye sight viewed from the sensor port of the radiation meter toward the inner bottom of the probe tube. Further, the length of the joint tube is preferably the same or larger than the length of the probe tube. Accordingly, in most cases, it is sufficient that the entire length of the jointed body of the probe tube and the joint tube is 2,500 mm.

The surface of the zirconium boride ceramics is oxidized by oxygen in air at a high temperature such as about 1,500° C., and a fume of $B_2O_3$ is produced through a reaction of $2ZrB_2 + 5O_2 \rightarrow 2ZrO_2 + 2B_2O_3$. The fume drifts until the inner surface of the probe tube of zirconium boride ceramics is covered with $ZrO_2$, for instance, for several hours. The inventors of the present application have found that measurement values of temperature obtained by the radiation thermometer are lowered by 20°-40° C. while the fume drifts in the probe tube.

In order to eliminate influence by the fume of $B_2O_3$ and to obtain correct measurement values of temperature, it is effective to form the probe tube to have a dual structure of the probe tube and an inner probe tube of oxide ceramics.

The oxide ceramics are durable to an oxidizing atmosphere and do not produce fume by oxidation. For oxide ceramics, zirconia ceramics, magnesia ceramics and alumina ceramics having a high melting point can be used. In particular, alumina ceramics is most preferable for a material for the inner probe tube since products of alumina ceramics having various dimensions are commercialized and alumina ceramics do not react with zirconium boride ceramics at the working temperatures.

To avoid the fume of $B_2O_3$, a probe tube of zirconium boride ceramics may be previously heated in an oxidizing atmosphere so that a $ZrO_2$ layer is formed at the inner surface.

Further, it is effective to inject gas such as Ar or $N_2$ into the probe tube of zirconium boride ceramics so that the inside of the probe tube is filled with a non-oxidizing gas when used. In a case that temperature measurement is conducted by using a radiation meter, a correct temperature measurement value can be obtained as the apparent emissivity of radiation having a wavelength used for measurement at a portion of measurement approaches 1.

For instance, when ceramics having an emissivity of 0.25 with respect to the radiation of measuring wavelength is used for the probe tube, a relation of the ratio (L/R) to the apparent emissivity of the inner bottom of the probe tube is shown in Table 1. Where L is the depth of the inner bottom of the probe tube from the surface of molten metal and R is the inner diameter of the probe tube.

Since a radiation meter using a monochrome radiation is little influenced by scattered light from surrounding or ambient gas, and use of the radiation meter is preferable to obtain accurate temperature measurement.

A two color radiation meter for measuring temperature by comparing the intensity of two radiations having different wavelengths may be used instead of the radiation meter for measuring temperature through the intensity of a radiation with respect to a single wavelength.

TABLE 1

| L/R | Apparent emissivity $\epsilon$ |
|---|---|
| 2 | 0.640 |
| 4 | 0.844 |
| 6 | 0.926 |
| 8 | 0.962 |
| 10 | 0.978 |
| 15 | 0.999 |

EXAMPLES

Now, the radiation thermometer for molten iron of the present invention will be described in further detail with reference to Examples wherein the temperature of molten pig iron flowing in a channel from a blast furnace has been measured. However, it should be understood that the present invention is by no means restricted by such Examples.

Figure 1:
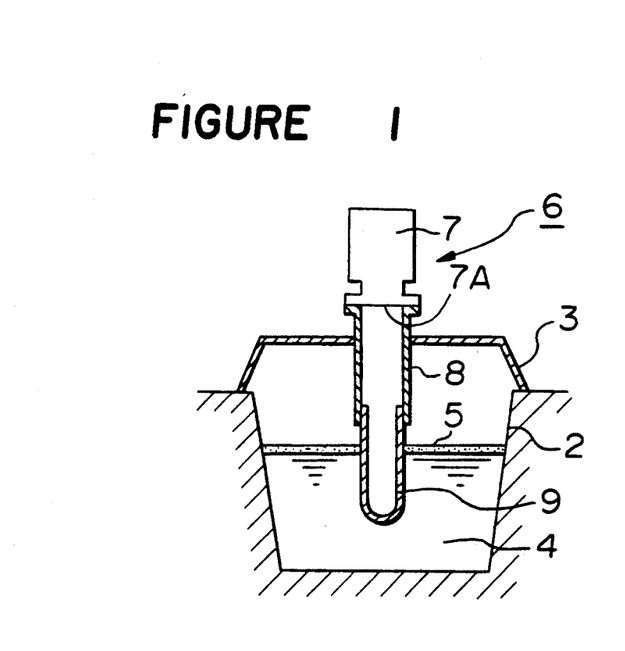
FIG. 1 is diagram showing in cross section the radiation thermometer for molten iron of the present invention being used for the temperature measurement of molten pig iron in a channel.

FIG. 1 is a diagram in cross-section which shows an example of a state of use of the radiation thermometer for molten iron of the present invention which is utilized for measuring the temperature of the molten pig iron flowing in a channel.

In FIG. 1, a radiation thermometer for molten iron 6 comprises a radiation meter 7 and a probe tube 9 whose forward end is closed in a hemispheroidal form, the probe tube 9 being attached to the sensor port 7A of the radiation meter 7 through a joint tube 8 made of a metal such as stainless steel. The probe tube 9 is made of zirconium boride ceramics having excellent corrosion resistance to both the molten iron 4 and slag 5 floating on the molten iron. The probe tube of zirconium boride ceramics having an outer diameter of 28 mm, an inner radius R of 8.5 mm and a length of 400 mm was used. The probe tube was immersed in the molten metal at a depth L of about 210 mm, the depth L being the distance from the inner bottom of the probe tube to the surface of the molten metal.

Figure 3:
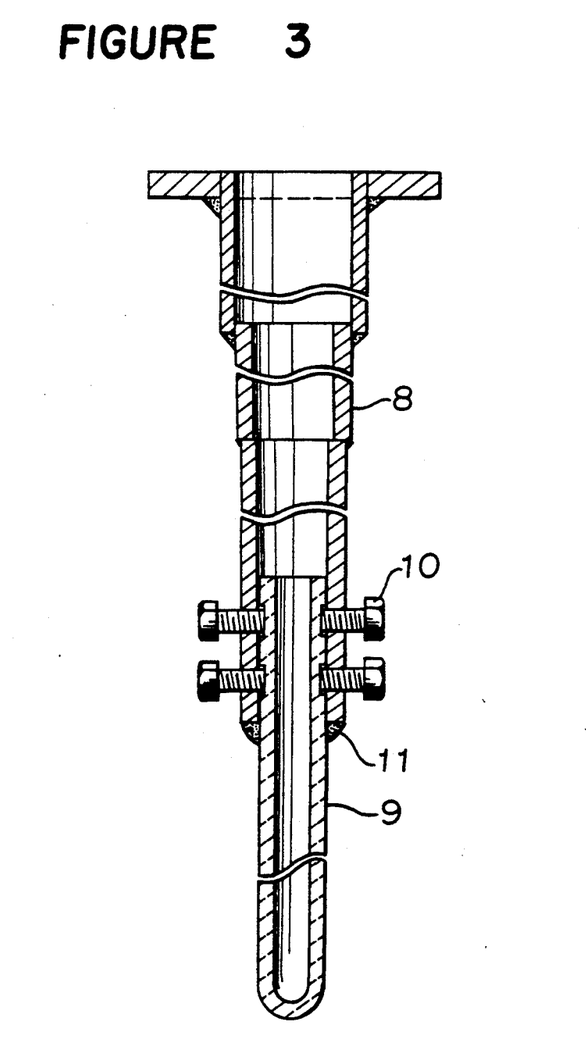
FIG. 3 is a cross-sectional view showing an embodiment of the radiation thermometer of the present invention which shows a state of connection of the probe tube with the joint tube.

FIG. 3 shows a state of the probe tube connected with the joint tube wherein the joint tube 8 has an upper portion which is upwardly enlarged which is connected to the probe tube 9 by means of bolts 10 and cement 11 of an inorganic material. The entire length of the probe tube 9 and the joint tube 8 connected together is 2,000 mm.

The zirconium boride ceramics used for the probe tube in the Example is composed of 10 wt. % of BN, 4 wt. % of SiC and the rest being substantially $ZrB_2$. In the zirconium boride ceramics used, the relative density of a sintered body is 97%, the bending strength is 48 kg/mm$^2$, the thermal spalling resistance $\Delta T$ is 600° C., and the emissivity in a visible light range is 0.5–0.7. The radiation meter used was Model IR-RST-65S manufactured by Chino Kiki Seisakusho. The radiation meter employs a sensor of silicon cell and a filter having interference film, and is capable of measuring the temperature with a resolution of 1° C. in a range of 1,000°–1,600° C. by a monochromatic radiation having a wavelength of 0.65 $\mu$m.

Since the radiation thermometer is used on the channel, the radiation meter was received to protect from the atmosphere of high temperature in a cooling box which is cooled by supplying air. Measurement of the temperature of the molten pig iron 4 flowing in the channel 2 by using the radiation thermometer for molten iron 6 is conducted as follows. The probe tube of the radiation thermometer is inserted in an opening formed in a cover for the channel and the forward end of the probe tube is held for about 30 minutes above the molten pig iron so that the probe tube of zirconium boride ceramics is preliminary heated. By the preliminary heating, the temperature of the dipping portion of the probe tube becomes about 900° C., whereby a thermal shock which may be caused when the probe tube is immersed in the molten metal is moderated and a phenomenon that slag floating on the molten metal comes into contact with the immersed probe tube and cooled to deposit on the tube wall can be minimized. The radiation thermometer is lowered to a state that the bottom end of the probe tube is immersed in the molten pig iron at a depth of about 210 mm, and then, the radiation thermometer is fixed to the cover of the channel. Thus, a radiation emitted from the inner bottom of the probe tube which has the same temperature as the molten pig iron reaches the sensor port 7A of the radiation meter 7 without suffering obstacle by the slag floating on the molten metal and influence by fume produced from the molten material.

Figure 2:
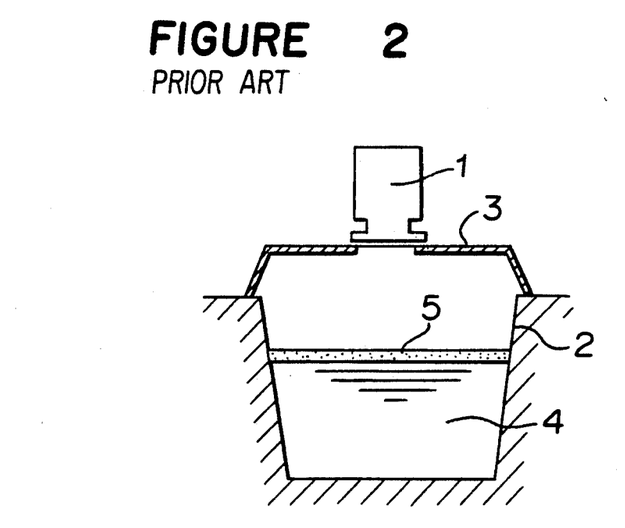
FIG. 2 is a diagram showing in cross section a state of measuring the temperature of molten pig iron in a channel by a conventional radiation thermometer.

For comparison, measurement of the temperature of molten pig iron was conducted by using a conventional radiation thermometer without using the probe tube as shown in FIG. 2. Further, measurement of the temperature was conducted by using disposal thermocouple type thermometers. Thus obtained measurement values are shown for comparison in FIGS. 4 and 5.

Figure 4:
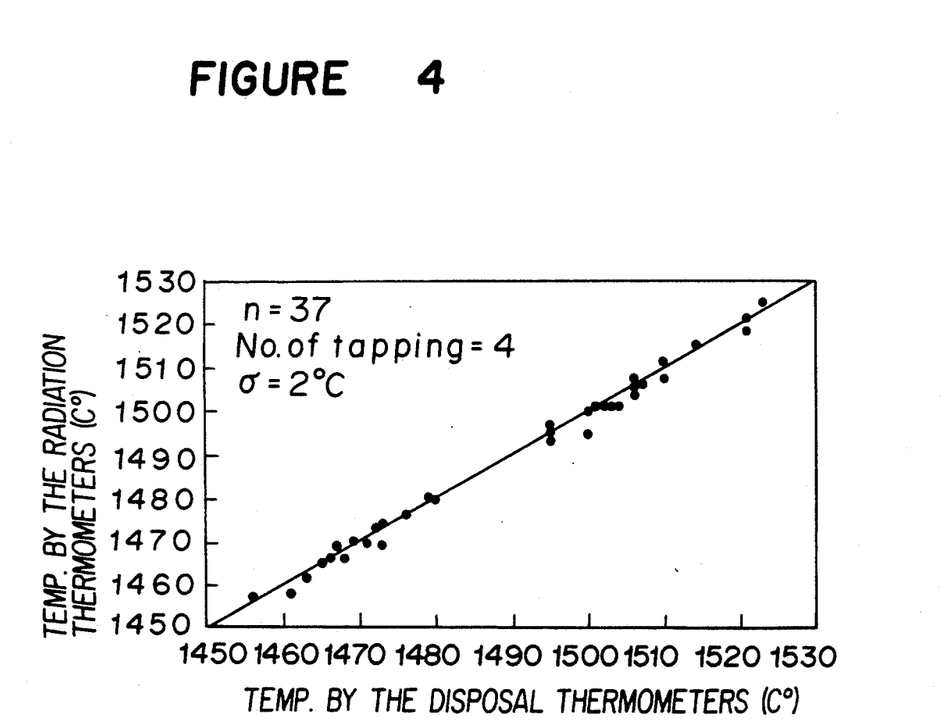
FIG. 4 is a diagram of a correlation in which measurement values (dots) obtained by measuring 37 times the temperature of molten pig iron flowing in a channel by disposal thermocouple type thermometers are compared with measurement values (solid line) obtained by measuring the temperature of the molten pig iron by the radiation thermometer for molten iron of the present invention in four times of tapping.

FIG. 4 is a diagram showing the temperature of molten pig iron flowing in a channel from a blast furnace in 4 tapping operations for about 12 hours in total. In FIG. 4, a solid line represents a result of temperature measurement by using the radiation thermometer for molten iron of the present invention and dots represent temperatures measured by the disposal thermocouple type thermometers.

Figure 5:
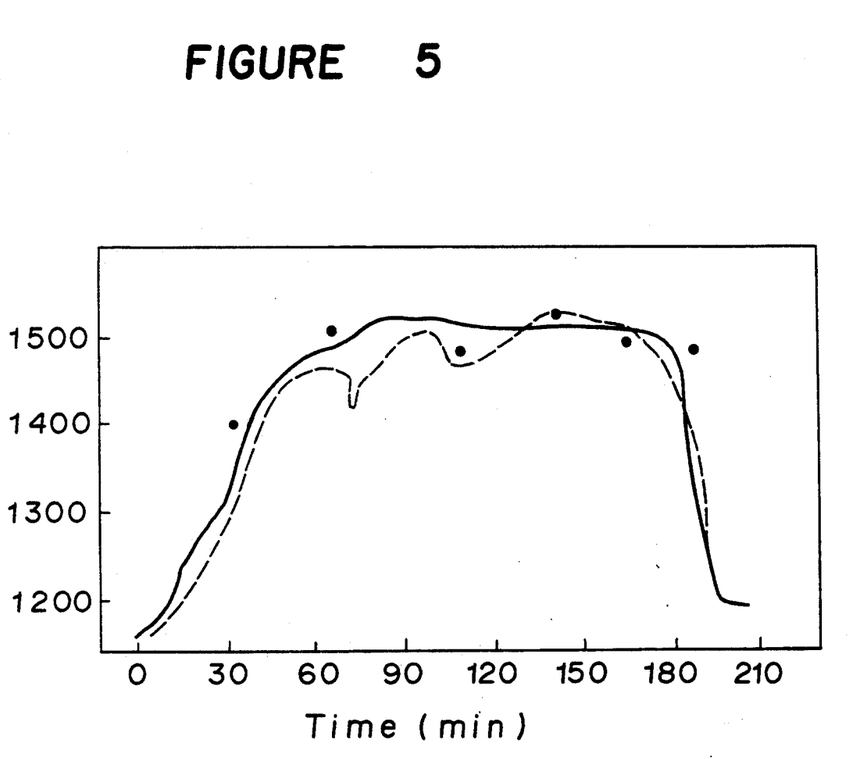
FIG. 5 is a graph showing a result obtained by measuring the temperature of molten pig iron flowing in a channel in a single tapping operation wherein a solid line represents temperature measured by the radiation thermometer for molten iron of the present invention; a broken line represents temperature obtained by using a conventional radiation thermometer and dots represent temperature obtained by disposal thermocouple type thermometers.

FIG. 5 is a graph showing measurement values for the temperature of molten pig iron flowing in a channel in one tapping operation which lasts for about 3 hours in which measurement values by the disposal thermocouple type thermometers and the radiation thermometer of the present invention as well as measurement values by a conventional radiation thermometer without using a probe tube (a broken line) are shown.

From the results of temperature measurement, it was found that a highly accurate temperature measurement value such that the standard deviation $\sigma$ of 2° C. when the apparent emissivity of the inner bottom of the probe tube was 0.999 was obtained by using the radiation thermometer for molten iron of the present invention while the standard deviation $\sigma$ of the temperature measurement value by the disposal thermocouple type thermometers was 3° C. For the temperature measurement values by the disposal thermocouple type thermometers, it is unavoidable that there causes fluctuation in measurement values because the thermocouple is renewed at every measuring operation.

FIG. 5 shows that there is fluctuation in measurement values obtained by using a conventional radiation thermometer without using a probe tube, because of interference by floating substances such as slag on the molten pig iron, whereas such fluctuation in measurement values is eliminated when the radiation thermometer for molten iron of the present invention is used.

Figure 6:
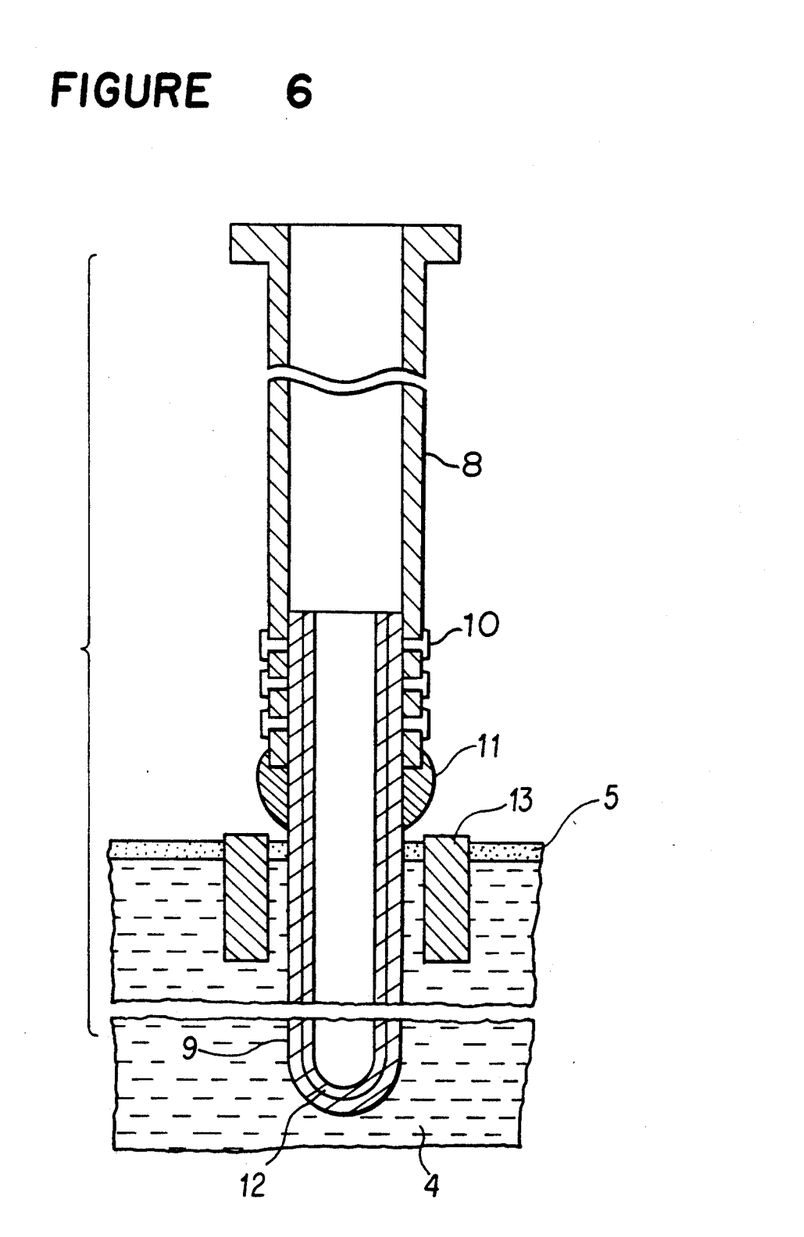
FIG. 6 is a longitudinal cross-sectional view showing another embodiment of the radiation thermometer of the present invention.

FIG. 6 is a cross-sectional view showing another embodiment of the radiation thermometer for molten iron of the present invention. According to this embodiment, an inner probe tube 12 made of alumina ceramics including $Al_2O_3$ at an amount of 99 wt. % or more is disposed inside a probe tube 9 made of zirconium boride ceramics. In FIG. 6, the length of the probe tube 9 is 400 mm, the outer diameter is 45 mm and the inner diameter is 35 mm. The inner probe tube 12 has its entire length of 395 mm, an outer diameter of 32 mm and an inner diameter of 28 mm. The probe tubes 9, 12 are connected to a joint tube 8 of stainless steel by means of bolts 10 and cement 11 of an inorganic material. The entire length of the jointed tube is 2,000 mm.

Figure 7:
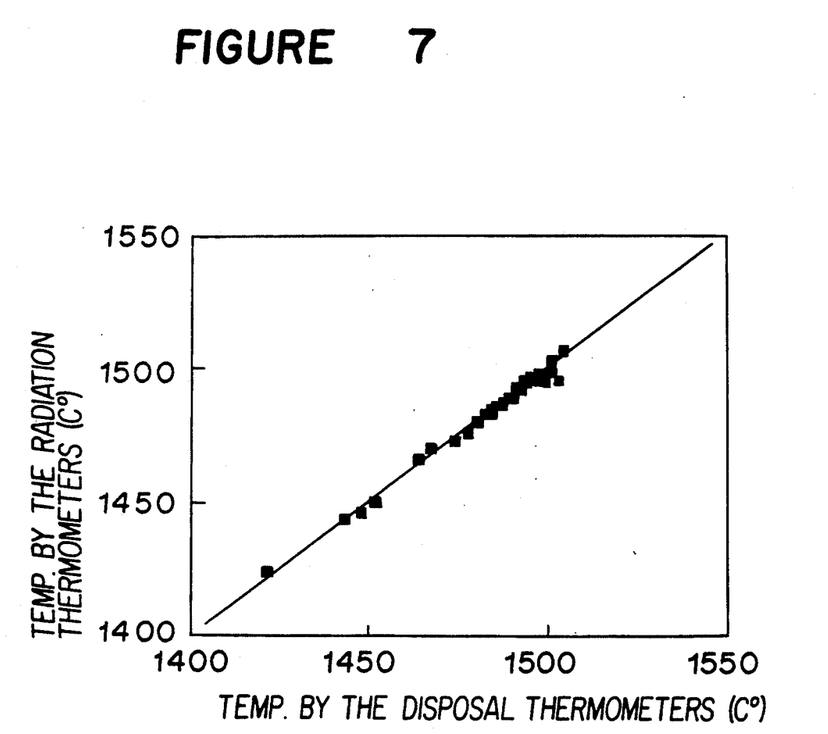
FIG. 7 is a graph showing a correlation of measurement values of the temperature of molten pig iron flowing in a channel which have been obtained by the radiation thermometer of the present invention in which the probe tube as shown in FIG. 6 was used, and measurement values obtained by using disposal thermocouple type thermometers wherein dots represent the measurement values by the disposal thermocouple type thermometers.

The probe tube having the above-mentioned construction was combined with the above-mentioned radiation meter to obtain a radiation thermometer for molten iron. With use of it, the temperature of molten pig iron flowing in a channel was measured during 9 tapping operations in the same manner as described before. In this case, the composition of zirconium boride ceramics included 4 wt. % of SiC and the rest being substantially $ZrB_2$, and preliminary heating was conducted as before for about 40 minutes so that the temperature of the dipping portion of the probe tube was at least 1,000° C. At the same time, the temperature of the molten pig iron was measured at 84 times by disposal thermocouple type thermometers. FIG. 7 is a diagram showing the correlation of temperature measurement values of the radiation thermometer for molten iron of the present invention and the disposal thermocouple type thermometers.

From FIG. 7, it was confirmed that excellent and accurate temperature measurement such as the standard deviation being about 2° C. could be obtained in the same manner as mentioned before when the radiation thermometer for molten iron of the present invention was used.

In order to further improve the durability, a ring shaped protector was applied. This ring shaped protector is shown as element 13 in FIG. 6. A radiation thermometer which was prepared by winding a sealing tape of alumina silica fibers around the probe tube of the radiation thermometer as shown in FIG. 6 and fitting at the outer circumference of the sealing material a ring-shaped protector made of the same material as the probe tube, which had an outer diameter of 100 mm, an inner diameter of 60 mm and a height of 100 mm, was tested to measure the temperature of molten pig iron. In this case, the ring-shaped protector became free in a state of floating with respect to the surface of the molten pig iron, whereby the durability of the radiation thermometer was improved more than 3 times, and accurate temperature measurement could be continued for more than 200 hours.

In a case that molten steel is to be measured, substantially the same method for measuring as described above can be employed except that a range of measuring temperature is more or less higher, e.g. 1,500°-1,650° C. It was confirmed that the probe tube of the radiation thermometer of the present invention showed a sufficient durability even when it was immersed in molten steel with floating slag.

By the application of the radiation thermometer for molten iron of the present invention to the measurement of the temperature of the molten iron, influence to measurement values due to the presence of slag or the like floating on the molten iron such as molten pig iron or molten steel is eliminated and temperature measurement can be stably and continuously conducted with a high accuracy. As a result, it is possible to obtain correct temperature measurement values in a continuous and stable manner of molten iron which is indispensable for automation and artificial intelligence control for processes from pig iron making to steel making. Further, in the radiation thermometer of the present invention, the number of elements consumed is small in comparison with the conventional thermocouple type thermometer, the possibility of occurrence of errors due to the deterioration of a thermocouple is eliminated, and working for measuring temperature and running cost have been remarkably reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A radiation thermometer for molten metal, comprising:
   a probe tube having a closed bottom end to be immersed in molten metal and an open top end;
   a radiation meter having a sensor port fixed at the open top end of the probe tube to receive radiation emitted from an inner bottom of the probe tube and thereby measure the temperature of the molten metal, wherein said molten metal is molten pig iron or molten steel, the probe tube comprises zirconium boride ceramics and the inner bottom of the probe tube is formed into a spheroidal shape; and
   a ring shaped protector disposed to surround around the probe tube and which floats with the surface of the molten metal.

2. A radiation thermometer for molten metal, comprising:
   a probe tube having a closed bottom end for immersion in molten metal and an open top end;
   a radiation meter having a sensor port fixed to the open top end of the probe tube to receive radiation emitted from an inner bottom of the probe tube and thereby measure the temperature of the molten metal; and
   wherein said molten metal is molten pig iron or molten steel, the probe tube comprises zirconium boride ceramics, the inner bottom of the probe tue is formed into a spheroidal shape, and the entire length of the probe tube is between 20 and 700 times as large as the inner radius of the probe tube.

3. The radiation thermometer for molten metal according to claim 2, wherein a joint tube made of metal is provided between the radiation meter and the probe tube made of zirconium boride ceramics.

4. The radiation thermometer for molten metal according to claim 2, wherein the zirconium boride ceramics contain 1-15 wt. % of SiC and 0-29 wt. % of BN as accessory constituents and the rest being substantially $ZrB_2$.

5. The radiation thermometer for molten metal according to claim 2, wherein the probe tube is constituted by a probe tube of zirconium boride ceramics and an inner probe tube of oxide ceramics disposed inside the probe tube of zirconium boride ceramics.

6. The radiation thermometer for molten metal according to claim 5, wherein the oxide ceramics is alumina ceramics.

7. The radiation thermometer for molten metal according to claim 2, wherein the closed bottom end of the probe tube has a uniform wall thickness.

8. A radiation thermometer for molten metal, according to claim 2, further comprising a ring-shaped protector disposed around the probe tube and which floats with the surface of the molten metal.

9. A radiation thermometer for molten metal, comprising:
  a probe tube having a closed bottom end for immersion in molten metal and an open top end;
  a radiation meter having a sensor port fixed at the open top end of the probe tube to receive radiation emitted from an inner bottom of the probe tube and thereby measure the temperature of the molten metal; and
  wherein the probe tube comprises an inner tube comprising oxide ceramics disposed inside of an outer tube comprising zirconium boride ceramics and wherein the molten metal is selected from a member of the set consisting of molten pig iron and molten steel.

10. A thermometer according to claim 9, wherein:
  the inner bottom of the probe tube is formed into a spheroidal shape.

11. A thermometer according to claim 9, further comprising:
  a ring-shaped protector disposed to surround around the probe tube and which floats with the surface of the molten metal.

12. A thermometer according to claim 9, wherein:
  the entire length of the probe tube is between 20 and 700 times as large as the inner radius of the inner probe tube.

* * * * *